US012561787B2

(12) United States Patent
Lee

(10) Patent No.: US 12,561,787 B2
(45) Date of Patent: Feb. 24, 2026

(54) NEURAL NETWORK FOR TABULAR DATA

(71) Applicant: Applied Materials Israel Ltd.,
Rehovot (IL)

(72) Inventor: Hyung Geun Lee, Suwon-si (KR)

(73) Assignee: Applied Materials Israel Ltd.,
Rehovot (IL)

( * ) Notice: Subject to any disclaimer, the term of this
patent is extended or adjusted under 35
U.S.C. 154(b) by 182 days.

(21) Appl. No.: 18/516,837

(22) Filed: Nov. 21, 2023

(65) Prior Publication Data

US 2025/0166153 A1     May 22, 2025

(51) Int. Cl.
*G06T 7/00* (2017.01)

(52) U.S. Cl.
CPC .. *G06T 7/0004* (2013.01); *G06T 2207/20081*
(2013.01); *G06T 2207/20084* (2013.01); *G06T*
*2207/30148* (2013.01)

(58) Field of Classification Search
CPC ......... G06T 7/0004; G06T 2207/20081; G06T
2207/20084; G06T 2207/30148; G06N
3/098; G06N 3/09
See application file for complete search history.

(56) References Cited

U.S. PATENT DOCUMENTS

2022/0222806 A1* 7/2022 Shaubi ................. G06V 10/764
2023/0216853 A1* 7/2023 Shoham ................... G06N 5/01
706/12

2024/0232525 A9* 7/2024 Jain ...................... G06F 40/169
2025/0086781 A1* 3/2025 Sturlesi .................... G06T 7/11
2025/0124307 A1* 4/2025 Yahalom .............. G06T 7/0004
2025/0218205 A1* 7/2025 Vankina ........... G06V 30/19147

OTHER PUBLICATIONS

Borisov, Vadim, et al. "Deep neural networks and tabular data: A
survey." IEEE transactions on neural networks and learning systems
35.6 (2022): 7499-7519. (Year: 2022).*
Du, Lun, et al. "TabularNet: A neural network architecture for
understanding semantic structures of tabular data." Proceedings of
the 27th ACM SIGKDD Conference on Knowledge Discovery &
Data Mining. 2021. (Year: 2021).*
Ganaie M. A., et al., "Ensemble Deep Learning: A Review,"
Engineering Applications of Artificial Intelligence, 2022, vol. 115(C),
48 Pages.

(Continued)

*Primary Examiner* — Bobbak Safaipour
(74) *Attorney, Agent, or Firm* — Lowenstein Sandler
LLP / AMAT

(57) ABSTRACT

The presently disclosed subject matter includes a novel
computer-implemented method and computer system for the
classification of tabular data using a new neural network
classifier model (also referred to herein as "Tabular Neural
Network Classifier" or TNNC). The disclosed method and
system are characterized by improved accuracy and effi-
ciency, as compared to other existing tabular data classifi-
cation techniques such as Random Forests, XGBoost, etc.
The inventor found that the TNNC exhibits in general a
better TP to FP ratio in the classification output and a shorter
processing time, as compared to existing tabular data clas-
sification techniques.

20 Claims, 6 Drawing Sheets

(56) References Cited

OTHER PUBLICATIONS

Grinsztajn L., et al., "Why Do Tree-Based Models Still Outperform Deep Learning on Tabular Data?," 36th Conference on Neural Information Processing Systems, 2022, 33 Pages.

Harmon M., et al., "Activation Ensembles for Deep Neural Networks," IEEE International Conference on Big Data, 2019, pp. 206-214.

Kadra A., et al., "Well-Tuned Simple Nets Excel on Tabular Datasets," 35th Conference on Neural Information Processing Systems, 2021, 23 Pages.

Kamalov F., et al., "Deep Learning Regularization in Imbalanced Data," IEEE, International Conference on Communications, Computing, Cybersecurity, and Informatics (CCCI), 2020, 05 Pages.

Klambauer G., et al., Self-Normalizing Neural Networks, 31st Conference on Neural Information Processing Systems (NIPS), 2017, 102 Pages.

Kocaman V., et al., "Improving Model Accuracy for Imbalanced Image Classification Tasks by Adding a Final Batch Normalization Layer: An Empirical Study," 25th International Conference on Pattern Recognition (ICPR), 2021, 08 Pages.

Lin T. Y., et al., "Focal Loss for Dense Object Detection," Facebook AI Research (FAIR), 2018, 10 Pages.

Liu L., et al., "Solving the Class Imbalance Problem Using Ensemble Algorithm: Application of Screening for Aortic Dissection," BMC Medical Informatics and Decision Making, 2022, vol. 22(82), 16 Pages.

Liu Z., et al., "Self-Paced Ensemble for Highly Imbalanced Massive Data Classification," IEEE 36th International Conference on Data Engineering (ICDE), 2020, pp. 841-852.

Loffe S., et al., "Batch Normalization: Accelerating Deep Network Training by Reducing Internal Covariate Shift," International Conference on Machine Learning, 2015, 15 Pages.

Loshchilov I., et al., "Decoupled Weight Decay Regularization," The Seventh International Conference on Learning Representations, 2019, 19 Pages.

Maguolo G., et al., "Ensemble of Convolutional Neural Networks Trained with Different Activation Functions," Expert Systems With Applications, 2021, vol. 166(114048), 08 Pages.

Mienye I. D., et al., "A Survey of Ensemble Learning: Concepts, Algorithms, Applications, and Prospects," IEEE Access, 2022, vol. 10, pp. 99129-99149.

Mukhoti J., et al., "Calibrating Deep Neural Networks using Focal Loss," 34th Conference on Neural Information Processing Systems, 2020, 26 Pages.

Nandi A., et al., "Improving the Performance of Neural Networks with an Ensemble of Activation Functions", IEEE World Congress on Computational Intelligence, 2020, 18 Pages.

Park S., et al., "Analysis on the Dropout Effect in Convolutional Neural Networks," ACCV 2016, Part II, LNCS 10112, 2017, pp. 189-204.

Peibei S., et al., "An Ensemble Tree Classifier for Highly Imbalanced Data Classification," J Syst Sci Complex 34, 2021, pp. 2250-2266.

Prechelt L., "Early Stopping—But When?," Neural Networks: Tricks of the Trade, LNCS 1524, 1998, pp. 55-69.

Shen X., et al., "Continuous Dropout," IEEE Transactions on Neural Networks and Learning Systems, 2018, vol. 29(9) pp. 3926-3937.

Web: "TFA.Losses.Sigmoid Focal Cross Entropy," TensorFlow Addons, Github, 04 Pages, 2023.

Zhang C. B., et al., "Delving Deep into Label Smoothing," IEEE Transactions on Image Processing, 2021, vol. 30, pp. 5984-5996.

Zhu Z., et al., "Geometric Structural Ensemble Learning for Imbalanced Problems," IEEE Transactions on Cybernetics, 2020, vol. 50(4), 13 Pages.

* cited by examiner

101

NEURAL NETWORK FOR TABULAR DATA

TECHNICAL FIELD

The presently disclosed subject matter is related to a computer system and method for the processing of tabular data. The presently disclosed subject matter is also related to defect detection in semiconductor specimens.

BACKGROUND

Tabular data refers to information organized in a structure comprising rows and columns, like a table. Tabular data is often used in databases, spreadsheets, and datasets, and is a common representation used in machine learning (ML) analysis.

Transforming various types of data into tabular data is sometimes applied during processing. In image processing this approach may involve features extraction from an image using image processing techniques, and then representing those features as numerical values in a tabular format.

A wafer is a thin, usually circular slice of semiconductor material, frequently made of silicon, that serves as a substrate for manufacturing integrated circuits. A die, also referred to as "a semiconductor die", denotes an independent and discrete component of an integrated circuit. Each die contains a specific set of electronic components, all fabricated together on the same wafer. Generally, during the manufacturing process, multiple dice are created on a single wafer, each being a copy of the same integrated circuit, effectively yielding identical copies of the integrated circuit design.

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination often involves generating images for a semiconductor specimen (e.g., wafer or die) and applying defect detection on the imaging output for the purpose of detecting defects of interests (DOIs) such as impurities, or irregularities in the dice that can affect their functionality and/or performance. A defect map can be produced to show suspected locations on the specimen having a high probability of being a defect. FIG. 6 shows images of dies (A and B) showing defects of interest, which are marked by a white circle.

GENERAL DESCRIPTION

Some DOI detection methods involve machine learning technologies used in the automated examination process, which assist, inter alia, to promote higher yield. For instance, supervised machine learning can be used for this purpose. In some cases, as part of this process, image output of dice is transformed into tabular data and machine learning classification algorithms are applied on the tabular data.

Tabular data used as input for machine learning typically has the appearance of a structured dataset organized in the form of rows and columns. Each row (or record) represents an individual sample (or observation), while each column corresponds to a feature associated with the sample.

Models which are commonly used for processing tabular data include Random Forests and Gradient Boosting Machines such as XGBoost and CatBoost. At the same time neural networks in general, and deep learning algorithms particularly, are known to underperform when applied on tabular data. One reason for this is related to the fact that such models, typically involving neural networks with multiple layers, are designed for learning hierarchical features from unstructured data types like images, text, and sequences, and are not well fitted for processing tabular data.

Factors which can be used for determining the quality of machine learning classification output of tabular data include accuracy and efficiency. Accuracy of the classification output can be defined based on the ratio between true positive (TP) and false positive (FP) detections. TP detection refers to the correct detection of objects of interests in a specimen, and the classification of the specimen as one which includes at least one object of interest. FP detection refers to the incorrect detection of noise in the data as an object of interest, and accordingly the incorrect classification of the specimen. In the context of semiconductor manufacturing, TP refers to correct detection of defects of interest (DOI) in a die or wafer, and FP refers to incorrect detection of defects in a die or wafer. A high TP to FP ratio is desired. Efficiency of the classification can be defined based on the processing time, including both training time and inference time of the machine learning model.

Different to DOIs, which refer to actual defects, noise refers to any random or undesirable interference that can obscure the true signal or introduce errors in measurements or inspections, causing incorrect detection of defects. In the context of semiconductor manufacturing, noise can arise from various sources, including equipment, environmental factors, or signal processing. Noise also includes defects that have no technical effect on the performance of the specimen (e.g., die). During defect detection it is desired to increase the detection of DOIs (TP detection) while decreasing detection of noise (FP detections).

The presently disclosed subject matter includes a novel computer-implemented method and computer system for the classification of tabular data using a new neural network classifier model (also referred to herein as "Tabular Neural Network Classifier" or TNNC). The disclosed method and system are characterized by improved accuracy and efficiency, as compared to other existing tabular data classification techniques such as Random Forests, XGBoost, etc. The inventor found that the TNNC exhibits in general a better TP to FP ratio in the classification output and a shorter processing time, as compared to existing tabular data classification techniques.

According to a first aspect of the presently disclosed subject matter there is provided a computer system comprising at least one processing circuitry configured to classify tabular data using a machine learning model, the processing circuitry being configured to:

obtain tabular data comprising one or more records, each record corresponding to a respective sample and comprising multiple features characterizing the sample;

utilize a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;

wherein the processing circuitry is configured for utilizing the ML model to:

provide to the ML model a collection of input features extracted from the tabular data;

for each NN thread:

apply a dropout operation on the collection of input features, to thereby obtain a respective subset of features selected from the collection input features;

apply a neural network algorithm on the respective subset of features to thereby obtain respective NN thread output at a respective output layer; and provide the respective NN thread output to the collective integration layer;

calculate, at the collective integration layer, a collective output of the ML model based on the multiple NN outputs, the collective output being indicative of a classification of the sample to a class selected from at least two classes.

In addition to the above features, the method according to this aspect of the presently disclosed subject matter can optionally comprise one or more of features (i) to (xix) below, in any technically possible and technically possible combination or permutation:

i. Wherein the processing circuitry is configured to apply the same neural network algorithm in all NN threads.

ii. Wherein the processing circuitry is configured to apply the neural network algorithm in all NN threads concurrently.

iii. Wherein the sample is a defect in a semiconductor specimen (e.g., die or wafer) and the features are attributes characterizing the defect; and wherein the collective output is indicative of whether the sample is classified as a defect of interest (DOI) or not.

iv. Wherein the processing circuitry is operatively connected to an examination system dedicated for detecting defects of interest in runtime as part of a semiconductor manufacturing process, and is configured to determine whether a suspect defect detected by the examination system is DOI or noise.

v. Wherein the tabular data is generated based on image data, where each record in the tabular data corresponds to a respective sample (e.g., defect) identified in an image (e.g., of a semiconductor specimen) and the features in the record are features characterizing the sample.

vi. Wherein the processing circuitry is further configured for obtaining the tabular data, to: obtain one or more images, process the one or more images and identify at least one sample and multiple respective features characterizing the sample, and generate a record in a tabular data format corresponding to the at least one sample, and add the features to the record.

vii. Wherein each NN thread is designed as an individual neural network (NN) comprising exactly two hidden layers.

viii. Wherein each NN thread is designed as an individual neural network (NN) and at least two NN threads comprise a different number of hidden layers.

ix. Wherein the processing circuitry is configured to apply at least two different activation functions, such that at least two different NN threads each apply a different activation function.

x. Wherein the processing circuitry is configured to apply an identical activation function (e.g., Sigmoid function) on all respective output layers in each NN thread.

xi. Wherein the processing circuitry is configured to apply a unique activation function at each NN thread.

xii. Wherein the processing circuitry is configured to apply the dropout on the collection of input features received in the collective input layer, such that at least two different subsets comprise each a different number of features.

xiii. Wherein the respective classification of the one or more samples in the tabular data is a binary classification.

xiv. Wherein the respective classification of the one or more samples in the tabular data is a multi-class classification.

xv. Wherein the output layer is part of the NN thread.

xvi. Wherein the processing circuitry is configured to apply regularization in at least one hidden layer of the two or more hidden layers, to thereby prevent overfitting of the ML model.

xvii. Wherein the respective classification of the one or more samples in the tabular data is a binary classification.

xiii. Wherein the processing circuitry is configured to apply regularization in at least one hidden layer of the two or more hidden layers, to thereby prevent overfitting of the ML model.

xix. Wherein the processing circuitry is configured to calculate the collective output of the ML model based on an average of the multiple NN outputs.

According to a second aspect of the presently disclosed subject matter there is provided a computer implemented method of classification of tabular data using a machine learning ML model, the method comprising:

obtaining tabular data comprising one or more records, each record corresponding to a respective sample and comprising multiple features characterizing the sample;

utilizing a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;

wherein utilizing the ML model comprises:

providing to the ML model a collection of input features extracted from the tabular data;

for each NN thread:

applying a dropout operation on the collection of input features, to thereby obtain a respective subset of features selected from the collection input features;

applying a neural network algorithm on the respective subset of features to thereby obtain respective NN thread output at a respective output layer; and providing the respective NN thread output to the collective integration layer;

calculating, at the collective integration layer, a collective output of the ML model based on the multiple NN outputs, the collective output being indicative of a classification of the sample to a class selected from at least two classes.

According to a third aspect of the presently disclosed subject matter there is provided a non-transitory computer readable medium comprising instructions that, when executed by a computer, cause the computer to perform a computerized method of classification of tabular data using a machine learning (ML) model, the method comprising:

obtaining tabular data comprising one or more records, each record corresponding to a respective sample and comprising multiple features characterizing the sample;

utilizing a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;

wherein utilizing the ML model comprises:

providing to the ML model a collection of input features extracted from the tabular data;

for each NN thread:

applying a dropout operation on the collection of input features, to thereby obtain a respective subset of features selected from the collection input features;

applying a neural network algorithm on the respective subset of features to thereby obtain respective NN thread output at a respective output layer; and providing the respective NN thread output to the collective integration layer;

calculating, at the collective integration layer, a collective output of the ML model based on the multiple NN outputs, the collective output being indicative of a classification of the sample to a class selected from at least two classes.

According to a fourth aspect of the presently disclosed subject matter there is provided an examination system dedicated for detecting defects of interest in runtime as part of a semiconductor manufacturing process, the system comprising, or is otherwise operatively connected to at least one processing circuitry configured to classify tabular data using a machine learning model, the processing circuitry being configured to:

obtain tabular data comprising one or more records, each record corresponding to a respective sample and comprising multiple features characterizing the sample;

utilize a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;

wherein the processing circuitry is configured for utilizing the ML model to:

provide to the ML model a collection of input features extracted from the tabular data;

for each NN thread:

apply a dropout operation on the collection of input features, to thereby obtain a respective subset of features selected from the collection input features;

apply a neural network algorithm on the respective subset of features to thereby obtain respective NN thread output at a respective output layer; and provide the respective NN thread output to the collective integration layer;

calculate, at the collective integration layer, a collective output of the ML model based on the multiple NN outputs, the collective output being indicative of a classification of the sample to a class selected from at least two classes.

The method, the system, and the non-transitory program storage device, disclosed with reference to the second, third, and fourth aspects, can optionally comprise one or more of features (i) to (xix) listed above, mutatis mutandis, in any technically possible combination or permutation.

The presently disclosed subject matter further contemplates a computer system, method and program storage device with instructions, which are each dedicated for executing the training of the Tabular Neural Network Classifier as described herein.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

While specific principles and operations of the presently disclosed subject matter are described herein in the context of DOI detection in semiconductor wafers, it is noted that this is done solely for the purpose of clarity and as a non-limiting example. The present disclosure contemplates the utilization of a novel machine learning model described herein in a wide array of applications, encompassing the processing of various forms of tabular data obtained from various resources, including image data, textual data (e.g., language), audio data, and more.

The terms "tabular data" and "table" as used herein should be expansively construed to include, in addition to tabular data per se, any structured data that is equivalent to tabular data, for example, a hash table where each key is connected to an array of values. In the context of the subject matter disclosed herein each key can represent an identifier of a sample, and each value in the array of values can represent a respective feature.

Notably, although the present description primarily refers to the detection of DOIs in semiconductor specimens, this is provided as a non-limiting example. The present disclosure encompasses the classification of other types of data as well. For example, specimens can include human tissue (e.g., liver tissue) and objects of interest include cells with some distinguishable characteristic. The TNNC can be used, for example, for classifying cells to either malignant or benign. In other examples, a specimen can include leaves, and objects of interest include distinguishable spots on the leaves' surface. The TNNC can be used for example, for classifying spots as healthy or disease-related.

Figure 1A:
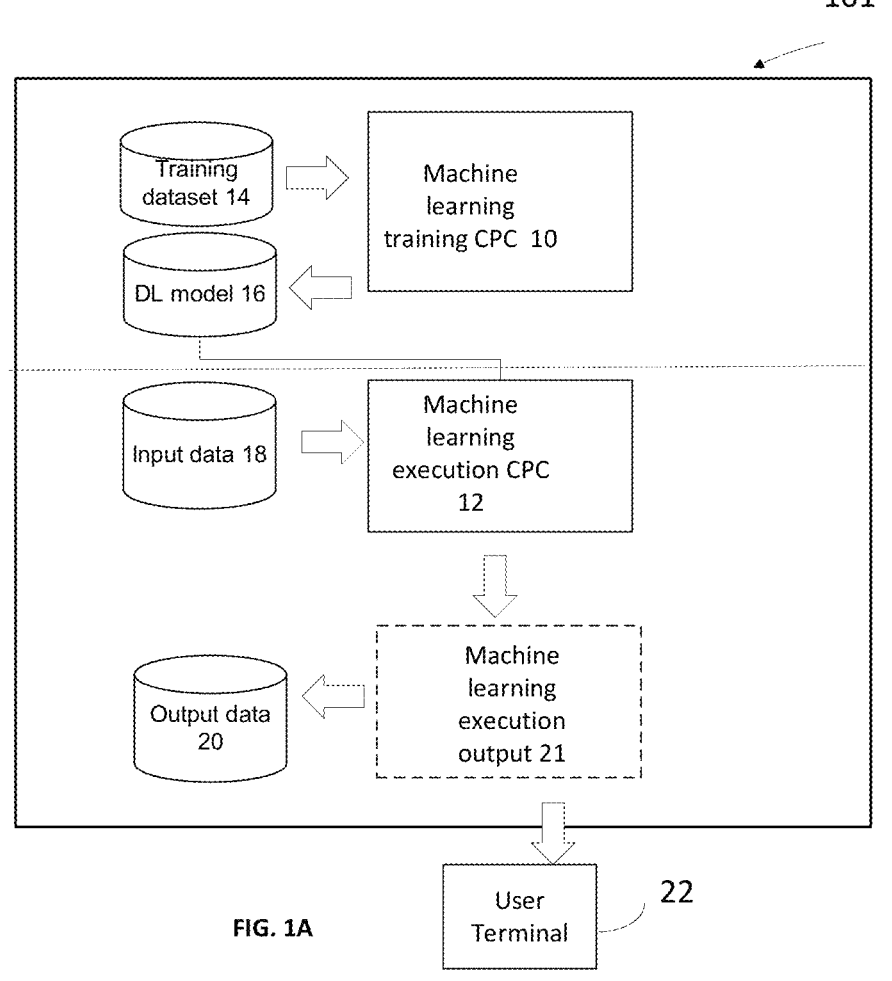
FIG. 1A schematically illustrates a generalized block diagram of a computer system dedicated for classifying tabular data, in accordance with certain examples of the presently disclosed subject matter.

Bearing the above in mind, attention is drawn to FIG. 1A, which is a generalized illustration of a computer system 101 configured with tabular data classification technology according to examples of the presently disclosed subject matter. FIG. 1A is a general example which demonstrates various principles of the presently disclosed subject matter. By way of non-limiting example, system 101 is shown to include more than one computer processing circuitry, including machine learning training computer processing circuitry 10, configured to receive a training dataset and generate the Tabular Neural Network Classifier (TNNC 21) and machine learning execution computer processing circuitry 12, configured to utilize the trained TNNC for classifying tabular data, e.g., for the purpose of anomaly detection. Per the illustrated example, a training dataset is stored in computer data-storage 14, being accessible to computer processing circuitry 10, and the machine learning output 21 generated by computer processing circuitry 10 is stored in computer data-storage 16. Further by way of example, the input data on which the TNNC is applied is stored in computer data-storage 18, and the classification output, which is the product of the TNNC, can be stored in computer data-storage 20 and/or provided to a user, e.g., at a user terminal 22. Notably, two or more of the computer data-storage devices shown in FIG. 1A can be implemented in a single data-storage device.

Figure 1B:
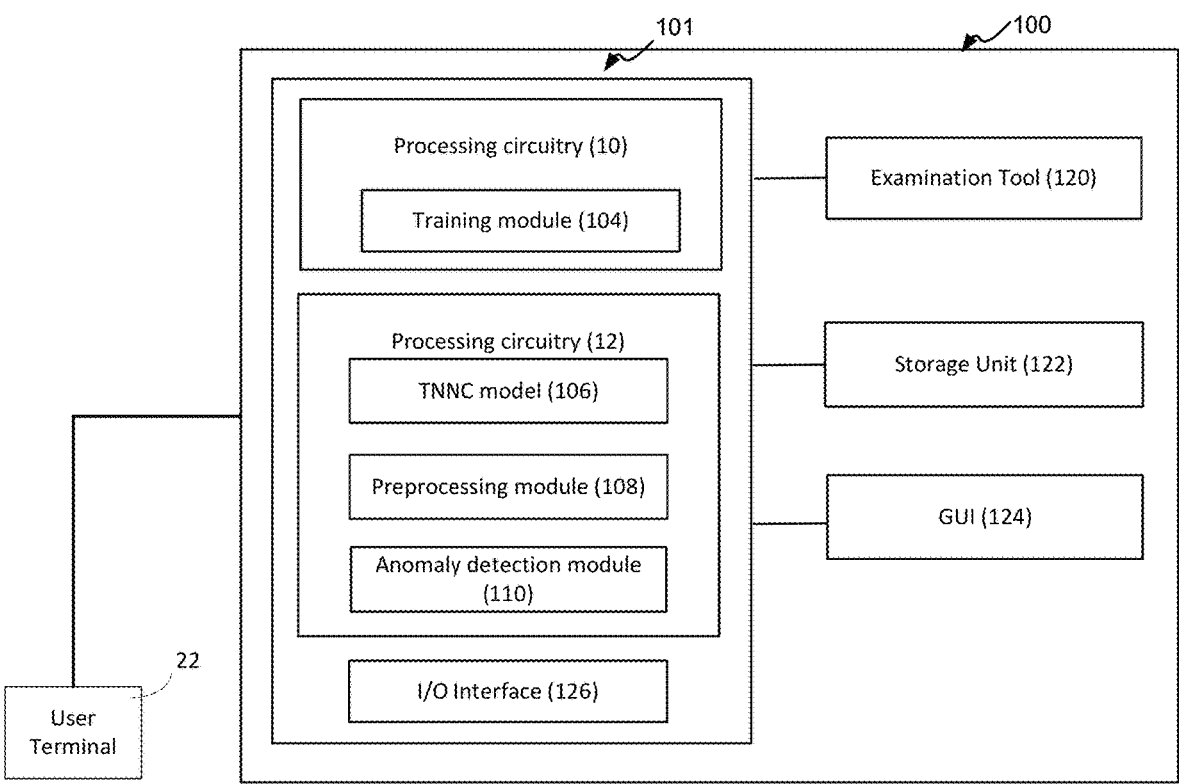
FIG. 1B schematically illustrates a block diagram of a semiconductor examination system that incorporates the system of claim 1, in accordance with certain examples of the presently disclosed subject matter.

FIG. 1B illustrates a block diagram of an examination system 100 in accordance with certain examples of the presently disclosed subject matter. Examination system 100 comprises, or is otherwise operatively connected to, computer system 101. In some non-limiting examples, system 101 is implemented as a dedicated processing circuitry integrated within system 100.

The process of semiconductor manufacturing often requires multiple sequential processing steps and/or layers, each one of which could possibly cause errors that may lead to yield loss. Examples of various processing steps can include lithography, etching, depositing, planarization, growth (such as, e.g., epitaxial growth), and implantation, etc. Various examination operations, such as defect-related examination (e.g., defect detection, defect review, and defect classification, etc.), and/or metrology-related examination, can be performed at different processing steps/layers during the manufacturing process to monitor and control the process. The examination operations can be performed a multiplicity of times, for example after certain processing steps, and/or after the manufacturing of certain layers, or the like.

As semiconductor fabrication processes continue to advance, semiconductor devices are developed with increasingly complex structures with shrinking feature dimensions, which makes it more challenging for conventional methodologies to provide satisfying examination performance.

The examination system 100 illustrated in FIG. 1B can be used for examination of a semiconductor specimen (e.g., a wafer, a die, or parts thereof) as part of the specimen fabrication process. The examination referred to herein can be construed to cover any kind of operations related to defect inspection/detection, defect classification, segmentation, and/or metrology operations, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying, and/or other processes provided with regard to the specimen or parts thereof. Without limiting the scope of the disclosure in any way, it should also be noted that the examination tools 120 can be implemented as inspection machines of various types, such as optical inspection machines, electron beam inspection machines (e.g., a Scanning Electron Microscope (SEM), an Atomic Force Microscopy (AFM), or a Transmission Electron Microscope (TEM), etc.), and so on.

The one or more examination tools 120 can include for example one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another, to build up, swath-at-a-time, an image of the surface of the wafer. For instance, the tool can scan a wafer along a swath from up to down, then switch to the next swath and scan it from down to up, and so on and so forth, until the entire wafer is scanned, and inspection images of the wafer are collected.

In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., scanning electron microscopy (SEM), etc. An SEM is a type of electron microscope that produces images of a specimen by scanning the specimen with a focused beam of electrons. The electrons interact with atoms in the specimen, producing various signals that contain information on the surface topography and/or composition of the specimen. An SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools 120 has metrology capabilities and can be configured to capture images and perform metrology operations on the captured images. Such an examination tool is also referred to as a metrology tool.

According to certain examples of the presently disclosed subject matter, the examination system 100 comprises computer system 101 operatively connected to the examination tools 120 and configured to receive the image output therefrom and execute defect examination on a semiconductor specimen in runtime based on runtime images obtained during specimen fabrication. System 101 is also referred to as a defect examination system.

System 101 shows, by way of example, computer processing circuitry 10 and computer processing circuitry 12 as previously shown in FIG. 1A. Processing circuitries 10 and 12 are configured to provide processing necessary for operating the system, as further detailed with reference to FIGS. 2-5. The processing circuitries 10 and 12 can be configured to execute several functional modules in accordance with computer-readable instructions implemented on a non-transitory computer-readable memory comprised in the processing circuitry. Such functional modules are referred to hereinafter as comprised in the processing circuitry.

One or more functional modules comprised in processing circuitry 12 can include preprocessing module 108 and defect examination module 110. Preprocessing module 108 is configured to receive images of a specimen (e.g., dice) and transform the images into tabular data. For example, inspection images and/or review images generated by scanning a semiconductor specimen can be received from inspection tool 120. Anomaly detection module 110 is configured to apply the previously trained TNNC model 106 for processing the tabular data and detecting DOIs. More specifically, anomaly detection module 110 is configured to process tabular data comprising information on one or more defect candidates and to classify the defect candidate as DOIs or noise.

According to certain embodiments of the presently disclosed subject matter, system 101 can be a runtime defect examination system configured to perform defect examination operations using a trained TNNC model 106, applied on runtime images obtained during specimen fabrication.

More specifically, processing circuitry 12 can be configured to obtain, (e.g., via an I/O interface 126) one or more runtime images of a semiconductor specimen acquired by an examination tool, transform the runtime image into corresponding tabular data representation, and provide the tabular data as input to anomaly detection module 110, which applies, on the tabular data, the ML model 106 for the purpose of detecting DOIs.

The presently disclosed subject matter further contemplates an inspection tool that integrates the function of system 101, e.g., as an add-on to the inspection tool. According to this example, a component, integrated in the inspection tool, receives the inspection tool output (e.g., images) generated by the inspection tool, and classifies candidate defects detected by the inspection tool to one class selected from at least two classes including a DOI class and a noise class, thus augmenting the inspection tool output.

In some examples, system 101 can be further configured as a training system capable of training the TNNC model during a training phase using a specific training set. In such cases, one or more functional modules comprised in processing circuitry 10 of system 101 can include a training module 104 and a TNNC model 106 to be trained.

The training module 104 can be configured to obtain a training dataset comprising one or more tables, each table comprising multiple records, each record corresponding to a defect candidate identified in an image of a specimen, such as a die or wafer, and annotated according to a respective classification, including at least one class corresponding to a DOI, and another class corresponding to noise.

The training module 104 can be configured to train the TNNC model 106 using the training set. Once trained, the TNNC model can be provided to processing circuitry 12. As mentioned above, in other examples training of the ML model is performed by a processing circuitry in a computer system other than system 101. Once the TNNC 106 has been trained, the trained model is stored in a computer data-storage accessible to computer system 101.

According to certain embodiments, system 100 can comprise a data-storage unit 122. The storage unit 122 can be configured to store any data necessary for operating system 101, e.g., computer software which is loaded during execution of any one of the modules described above, intermediate processing results generated by system 101, the training dataset, the trained TNNC model, and/or the outputs of the TNNC module.

In some embodiments, system 100 can optionally comprise a computer-based Graphical User Interface (GUI) 124 which is configured to enable user-specified inputs related to system 101. For instance, the user can be presented with a visual representation of the specimen (for example, on a display operatively connected to system 100), including the images of the specimen, etc. The user may be provided, through the GUI, with options of defining certain operations and/or parameters. The user may also view the operation results or intermediate processing results, such as, e.g., the defect examination outputs, some type of graphical simulation of the results, etc., within the GUI.

It should be further noted that in some embodiments at least some of examination tools 120, storage unit 122, and/or GUI 124, can be external to the examination system 100 and operate in data communication with systems 100 and 101 e.g., via I/O interface 126.

System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Figure 2:
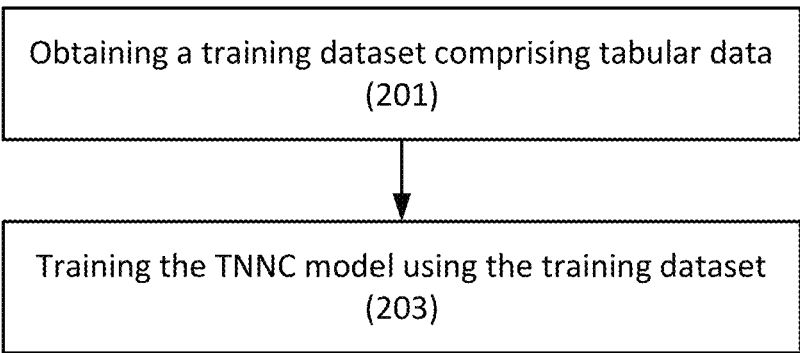
FIG. 2 is a high-level flowchart showing operations carried out as part of the training of a machine learning model, in accordance with an example of the presently disclosed subject matter.

Referring to FIG. 2, this shows operations carried out as part of training of a Tabular Neural Network Classifier usable for classification of tabular data in accordance with certain examples of the presently disclosed subject matter.

A training dataset can be obtained (201) comprising at least one table. The table comprises multiple records (rows), each record corresponding to a respective sample (or observation), and comprises, in turn, multiple columns. Each column in the record corresponds to a certain feature or attribute characterizing the sample and comprises a respective value. The number of features can vary, depending, inter alia, on the type and availability of data. In some examples the number of features is 25 or greater.

In the context of semiconductor examination, each table corresponds to one or more respective semiconductor specimens. In some examples, each table can correspond to a respective die or to multiple dice in a wafer. A single table can include multiple records corresponding to dice of many wafers. Each record in a table corresponds to a respective defect candidate and each column corresponds to a feature characterizing the defect. In the training set, in addition to the feature values, each record is also labelled according to its respective class, including at least two classes, namely true defect of interest (DOI) and noise.

In some examples, the tabular data is generated by applying computer processing (e.g., by preprocessing module 108) on images of semiconductor specimens, and identifying, in the images, defect candidates. As mentioned above, images can include inspection images and/or review images generated by scanning semiconductor wafers, generated for example as part of the semiconductor fabrication process. Various image processing techniques can be applied on the images for detecting, in each wafer, the respective dice and defect candidates in each die, and determining the features values of each defect candidate. These techniques include, for example, edge detection, color segmentation, and object detection. In some examples, data labeling is performed by manually reviewing the dice and adding appropriate annotation to the tabular data using an appropriate software tool. In other examples, automatic labeling is applied. The TNNC model is trained using the training dataset (203) and the trained model is generated (21).

As known in the art, the training phase, particularly within the domain of neural networks, includes the iterative execution of forward and backward passes. During a neural network's forward pass, the model generates predictions based on input data, and subsequently evaluates these predictions against actual target values, resulting in the computation of an error or loss metric that quantifies the model's performance. Subsequently, in the back ward pass (commonly referred to as backpropagation), this error is retroactively propagated through the network's layers. Gradients pertaining to each parameter, including weights and biases, are computed as part of this process. These gradients are used for adjustments of the model's parameters through optimization techniques like gradient descent, for the purpose of minimizing the error. This iterative process persists until the neural network converges, enabling it to refine its predictive capabilities and generalize its acquired knowledge to make precise predictions on new, previously unseen data.

Figure 3:
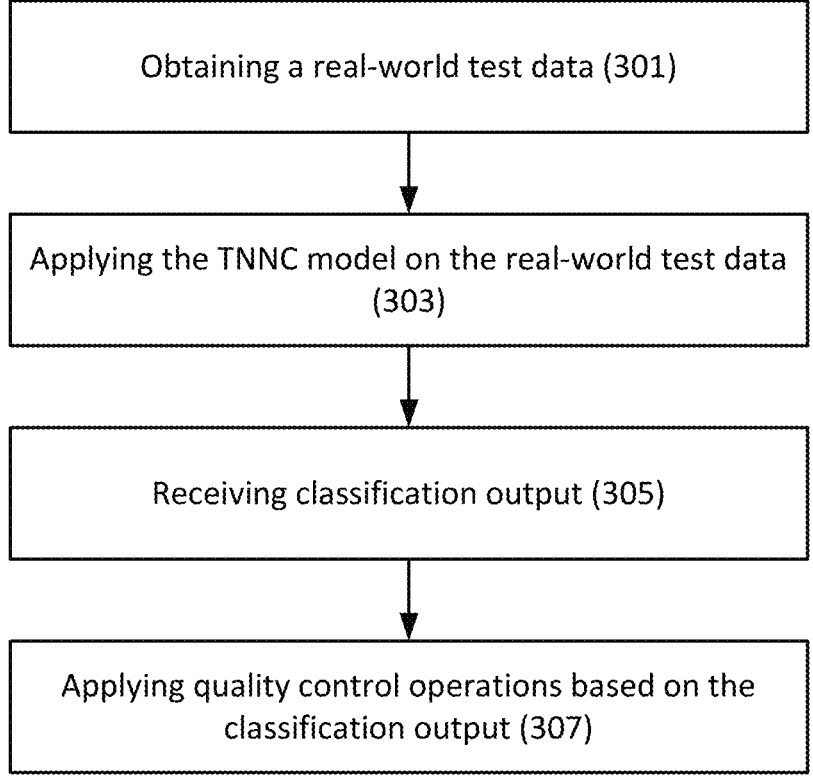
FIG. 3 is a high-level flowchart showing operations carried out as part of the execution of the trained machine learning model, in accordance with an example of the presently disclosed subject matter.

FIG. 3 illustrates a generalized flowchart of operations carried out during execution of the trained machine learning model usable for classification of tabular data in accordance with certain examples of the presently disclosed subject matter.

Real-world test data is obtained (301). The test data comprises at least one table where each table comprises, as in training, at least one, but generally multiple rows, each row corresponding to a respective sample. The table can be generated by processing one or more samples, extracting the feature values characterizing the sample, and inserting each value in the corresponding column in the respective record.

As explained above, the TNNC disclosed herein can be used for the examination of a semiconductor specimen, e.g., as part of the specimen fabrication process. Images of semiconductor specimens can be received (e.g., from examination tools 120) and transformed into tabular data representation as explained above with respect to block 201. In some examples, images are received during runtime and transformed into tabular data, which is then processed by the TNNC to detect DOI in the specimen.

The tabular data is constructed such that each record corresponds to a respective defect candidate, and each column corresponds to a respective feature characterizing the defect. During generation of the tabular data, each defect candidate identified in an image of a specimen is analyzed to determine the respective feature values of the defect. For example, a feature named "circular" characterizes the circularity of a defect candidate in the die, where 1 is assigned to a perfectly circular shape and 0 is assigned to a longitudinal shape. Another feature named "volume" can be determined by analyzing the volume of a defect candidate identified in a die.

The trained TNNC model is applied on the test data (303), which classifies the records (and corresponding defect candidates) to one of the classes (block 305). As mentioned above in some examples, classification is used for anomaly detection, i.e., determining whether a defect candidate is a DOI or noise.

Dice, which are identified to contain DOIs to noise ratio smaller than a certain threshold, are logged for quality control (block 307). In some examples, system 100 is configured to make decisions based on the TNNC model output, on whether to accept, reject, rework the die (microchips), and/or stop production based on detected defects. This process is crucial for maintaining the quality of microchips used in electronic devices, and involves a feedback loop to improve manufacturing processes.

A new machine learning (ML) model with a new neural network (NN) model architecture dedicated for processing tabular data is disclosed herein. The new machine learning model (also referred to herein as a "tabular neural network classifier" or TNNC in short) is characterized by a new model architecture which enables efficient and accurate classification of data in tabular format.

Figure 4:
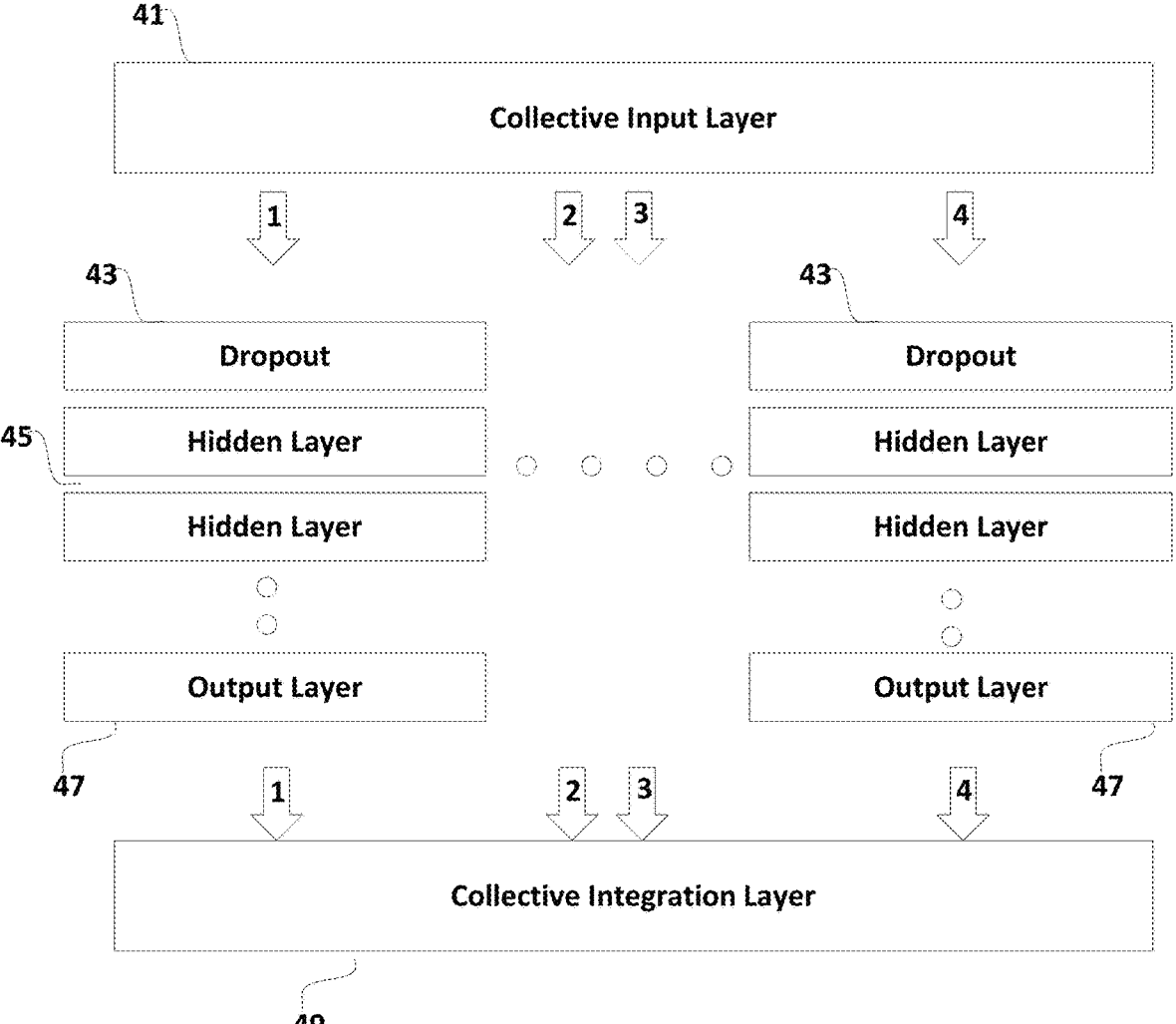
FIG. 4 is a diagram schematically illustrating the architecture of a novel Tabular Neural Network Classifier (TNNC), in accordance with an example of the presently disclosed subject matter.
Figure 5:
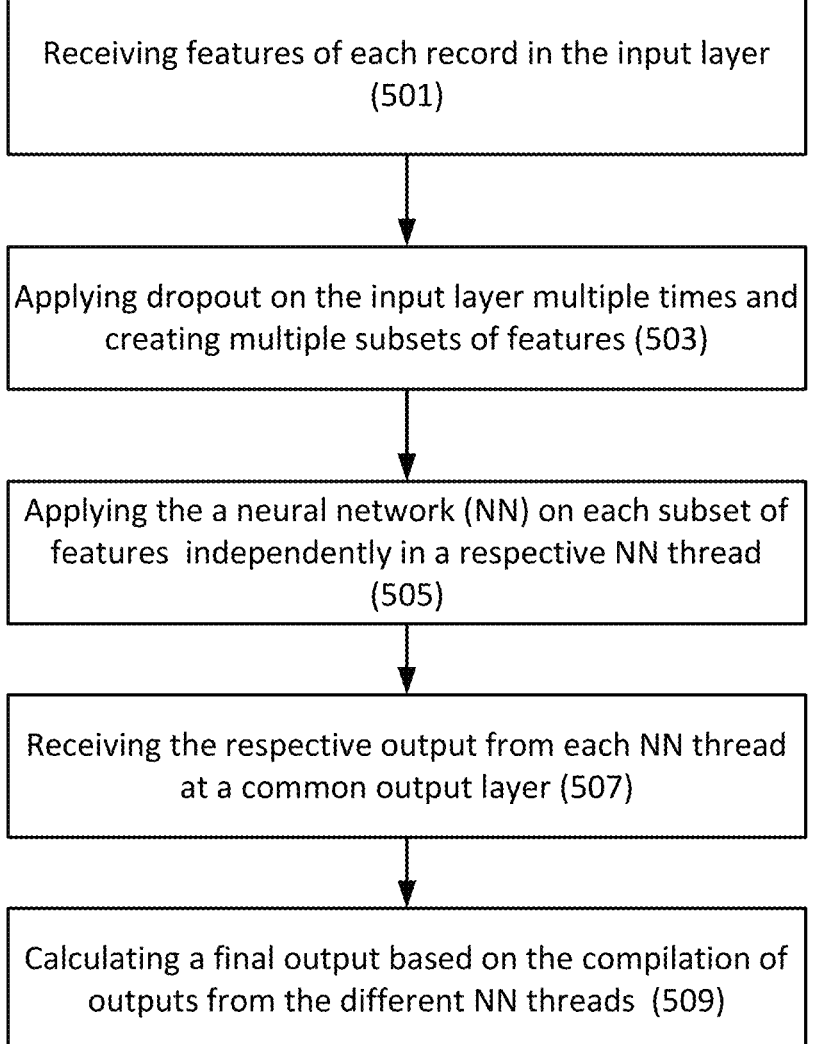
FIG. 5 is a flowchart showing operations carried out by the TNNC model, in accordance with an example of the presently disclosed subject matter.
Figure 6:
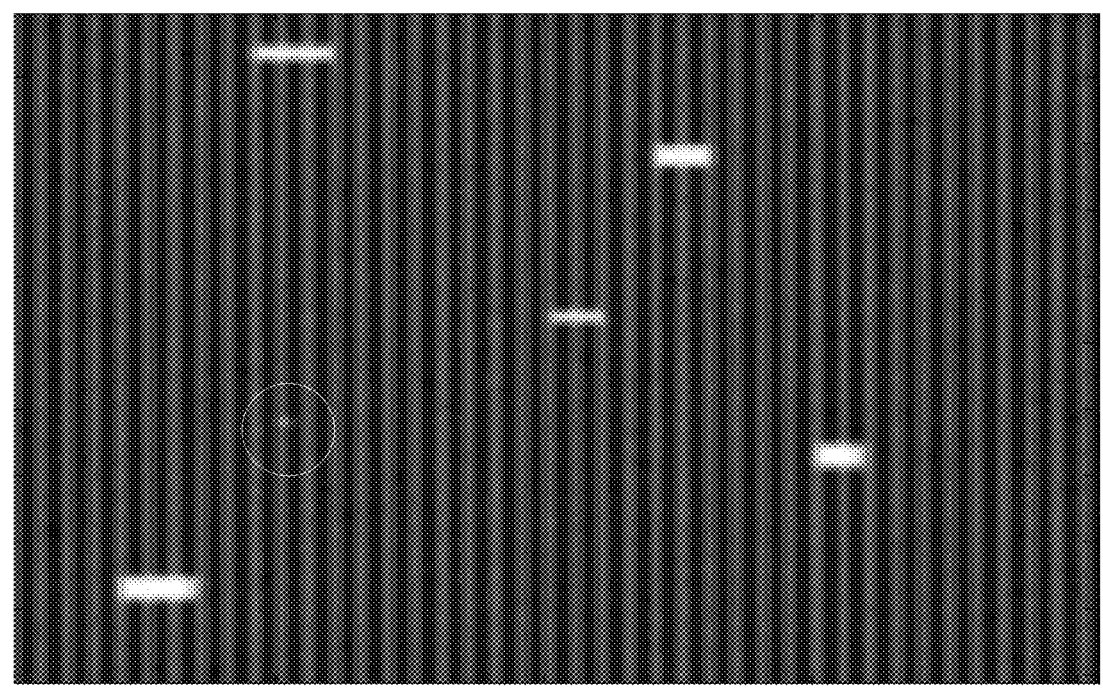
FIG. 6 shows an example of an image of a die, where DOI in each image are indicated by a white circle.
Figure 6:
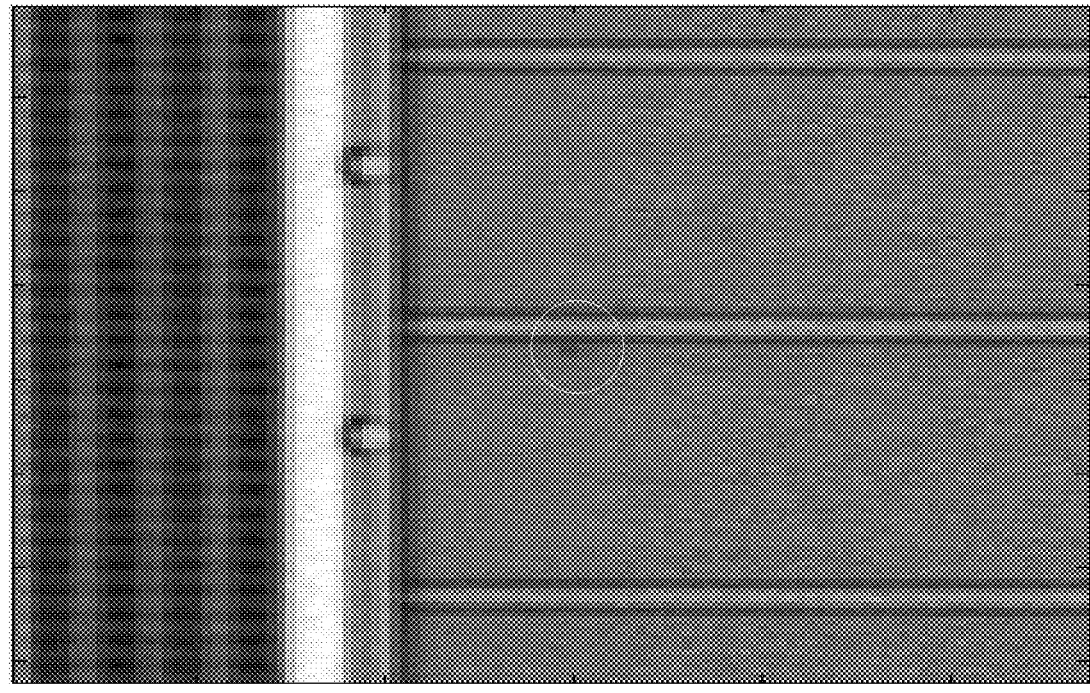

FIG. 4 is a schematic illustration of the TNNC architecture according to examples of the presently disclosed subject matter. FIG. 5 is a flowchart of operations carried out during TNNC usage according to examples of the presently disclosed subject matter. The training of the TNNC can be executed for example by training module 104 and the execution, and inference of the TNNC module can be, for example, by anomaly detection module 110, as described above. Training can be executed according to principles of supervised learning described above with reference to FIG. 2.

As illustrated in FIG. 4, the model comprises a single input layer ("collective input layer" 41) which serves for receiving the features of each record e.g., each defect (501).

Dropout (43) is applied on the input layer multiple times (503). Dropout operates by randomly removing certain features from the input layer, thus retaining only a subset of the features, and creating multiple (n) subsets, each subset including a randomly selected subgroup of features from the total group of features inserted to the input layer.

In some examples, all subsets comprise an equal number of features. In other examples, different subsets may comprise a different number of features. Dropout can be applied concurrently n times to thereby obtain the n subsets substantially at the same time. In some examples, dropout is applied with replacement.

Notably, dropout is normally used for preventing or reducing overfitting by randomly deactivating a fraction of the neurons in the hidden layers of a neural network for each forward and backward pass. Differently, it is suggested herein to apply dropout on the input layer, which serves as a passthrough layer, and, unlike the hidden layer, normally does not apply any processing on the data.

Furthermore, dropout is not used for its common purpose, of preventing overfitting but rather for mimicking bagging in a neural network. Bagging is normally used for reducing variance in machine learning models, such as Decision Trees, Random Forests, GBM, etc., and is not commonly used in neural networks, and particularly not in deep neural networks. Neural networks integrate various regularization methods for reducing overfitting. Furthermore, neural networks are complex by nature, and using bagging would further complicate the models and increase the computational demands.

A neural network (NN) is applied on each of the subsets of features (45; 505). The TNNC employs a neural network, where each subset of features is processed through a different set of neural network layers independently and concurrently. Each individual set of neural network layers is referred to herein as a "NN thread". In some examples, dropout can be implemented as an additional layer ("dropout layer") preceding the hidden layers in each NN thread.

By way of example, FIG. 4 shows the use of four respective NN threads, each used for processing a respective subset of features. Notably, using four NN threads is a non-binding example as a different number of NN threads can be used instead (e.g., three, five, six, etc.). Each NN thread comprises two or more of hidden layers. In some examples TNNC is implemented as deep neural network model where part or all of the NN threads each comprise many hidden layers, typically 3 or more. In some examples, hidden layers implement regularization methods for reducing overfitting.

In some examples, an identical neural network is utilized across all threads, while in other examples, the neural networks in different threads exhibit variations from one another to thereby increase diversity in the output of different threads. One type of variation is related to the number of features processed by each NN thread as mentioned above. Another type of variation is related to the number of hidden layers, where, in some examples, all NN threads comprise the same number of hidden layers, while in other examples different NN threads comprise a different number of hidden layers exhibiting different NN depth.

In some examples, to further increase diversity in the output of the different threads, each NN thread applies a different activation function. For example, for n=4 NN threads the following activation functions can be used in the different threads: GELU, SELU, Swish, and ReLU. If a greater number of NN threads is used, additional activation functions can be assigned to the additional NN threads.

Each NN thread provides a respective output ("neural network output") to a respective output layer (47; 507). The final output is calculated by an output layer common to all NN threads (509) ("collective integration layer" 49). In the collective integration layer, the final output is calculated based on the compilation of outputs from the different NN threads. According to one example, the final output is calculated as the average of the output values received from the different NN threads.

In some examples, in all output layers (47) of all NN threads, the same activation function is used to obtain a common output format which can be easily integrated. In one example, where binary classification is desired (e.g., classifying between DOI and noise) Sigmoid activation function is used, as it provides a binary output of 0 or 1. In other examples multi-class classification is applied, e.g., for classification to different types of DOIs. In such cases a SoftMax activation function can be used in all output layers (47) of all NN threads.

As mentioned above, the TNNC disclosed herein has been shown to be more accurate and more efficient than other existing tabular data machine learning classification techniques. In addition to these advantages, it is further noted that the TNNC architecture retains its ability to achieve improved accuracy and efficiency when employing a small number of hidden layers, even as few as two. This is one of the reasons TNNC requires a shorter computation time.

Furthermore, the TNNC architecture can be implemented using an exceptionally compact computer code as compared to other state-of-the-art neural network classifiers with similar functions. Consider ResNet50 as an example, which is a state-of-the-art neural network widely used in computer vision tasks such as image classification, object detection, and image segmentation. A comparison of trainable parameters between ResNet50 and TNNC disclosed herein, shows that while ResNet50 has over 23 million trainable parameters, TNNC has as little as 480 trainable parameters. Other tree-based classifiers, which operate by transforming the image data into tabular data format, are known to outperform ResNet50. The TNNC, which outperforms such tree-based classifiers (including Random Forests and XGboost), is implemented as a neural network with an exceptionally small computer code volume.

Unless specifically stated otherwise, as apparent from the above discussions, it is appreciated that, throughout the specification, discussions utilizing terms such as "obtaining", "utilizing", "providing", "applying", "receiving", "calculating" or the like, include an action and/or processes of a computer that manipulate and/or transform data into other data, said data represented as physical quantities, e.g. such as electronic quantities, and/or said data representing the physical objects.

The terms "computer", "computer system", "computer device", "computerized device" or the like used herein, should be expansively construed to include any kind of hardware-based electronic device with one or more data processing circuitries. Each processing circuitry can comprise, for example, one or more processors operatively connected to computer memory, loaded with executable instructions for executing operations, as described above.

The one or more processors referred to herein can represent, for example, one or more general-purpose processing devices, such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a graphics processing unit (GPU), a network processor, or the like.

The memories referred to herein can comprise, for example, one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

As will be further detailed with reference to the figures above, the processing circuitry can be configured to execute several functional modules in accordance with computer-readable instructions implemented on a non-transitory computer-readable storage medium. Such functional modules are referred to hereinafter as comprised in the processing circuitry.

As used herein, the phrase "for example," "such as", "for instance" and variants thereof, describe non-limiting embodiments of the presently disclosed subject matter. Reference in the specification to "one case", "some cases", "other cases", or variants thereof, means that a particular feature, structure, or characteristic described in connection with the embodiment(s), is included in at least one embodiment of the presently disclosed subject matter. Thus, the appearance of the phrase "one case", "some cases", "other cases", or variants thereof, does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately, or in any suitable sub-combination.

In embodiments of the presently disclosed subject matter, fewer, more and/or different stages than those shown in FIGS. 2 to 5 may be executed. In embodiments of the presently disclosed subject matter, one or more stages illustrated in the figures may be executed in a different order, and/or one or more groups of stages may be executed simultaneously.

FIGS. 1A and 1B illustrate general schematics of a computer system architecture in accordance with certain examples of the presently disclosed subject matter. Elements in FIGS. 1A and 1B can be made up of any combination of software and hardware and/or firmware that performs the functions as defined and explained herein. Elements FIGS. 1A and 1B may be centralized in one location or distributed over more than one location. For example, each one of processing circuitries 10 and 12 can be implemented as part of a different computer device, each located at a different geographical location. Furthermore, in some examples, the system may comprise fewer, more, and/or different elements than those shown in FIGS. 1A and 1B. For example, FIGS. 1A and 1B show two separate processing circuitries, each dedicated for executing certain functions of the system, however it would be clear to any person skilled in the art that the functionalities can be divided otherwise. For example, operations related to the training of the machine learning model and its execution assigned to processing circuitry 10 and processing circuitry 12 separately, can be otherwise implemented in a single processing circuitry.

Each component in FIGS. 1A and 1B may represent a plurality of the particular components, which are adapted to independently and/or cooperatively operate to process various data and electrical inputs, and for enabling operations related to the system disclosed herein. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

In some examples, certain components utilize a cloud implementation, e.g., implemented in a private or public cloud. Communication between the various components of the examination system, in cases where they are not located entirely in one location or in one physical entity, can be realized by any signaling system or communication components, modules, protocols, software languages and drive signals, and can be wired and/or wireless, as appropriate. For example, training operation of the tabular neural network classifier (TNNC) can, in some examples, be executed on a cloud computing infrastructure.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer system comprising at least one processing circuitry configured to classify tabular data using a machine learning model, the processing circuitry being configured to:
   obtain tabular data comprising one or more records, each record corresponding to a respective sample and comprising multiple features characterizing the sample;
   utilize a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;
   wherein the processing circuitry is configured for utilizing the ML model to:
   provide to the ML model a collection of input features extracted from the tabular data;
   for each NN thread:
      apply a dropout operation on the collection of input features, to thereby obtain a respective subset of features selected from the collection of input features;
      apply a neural network algorithm on the respective subset of features to thereby obtain respective NN thread output at a respective output layer; and
      provide the respective NN thread output to the collective integration layer; and
   calculate, at the collective integration layer, a collective output of the ML model based on multiple NN outputs of the ML model, the collective output being indicative of a classification of the sample to a class selected from at least two classes.

2. The system of claim 1, wherein the processing circuitry is configured to apply the same neural network algorithm in all NN threads.

3. The system of claim 1, wherein the sample is a defect in a semiconductor specimen and the features are attributes characterizing the defect; and wherein the collective output is indicative as to whether the sample is classified as a defect of interest (DOI) or not.

4. The system of claim 3, wherein the processing circuitry is operatively connected to an examination system dedicated for detecting defects of interest in runtime as part of a semiconductor manufacturing process and is configured to determine whether a suspect defect detected by the examination system is a DOI or noise.

5. The system of claim 1, wherein the tabular data is generated based on image data, where each record in the tabular data corresponds to a respective sample identified in an image and the features in the record are features characterizing the sample.

6. The system of claim 5, wherein the processing circuitry is further configured for obtaining the tabular data, to:

obtain one or more images;

process the one or more images and identify at least one sample and multiple respective features characterizing the sample; and generate a record in a tabular data format corresponding to the at least one sample and add the features to the record.

7. The system of claim 1, wherein each NN thread is designed as an individual neural network (NN) comprising exactly two hidden layers.

8. The system of claim 1, wherein each NN thread is designed as an individual neural network (NN) and at least two NN threads comprise a different number of hidden layers.

9. The system of claim 1, wherein the processing circuitry is configured to apply a unique activation function at each NN thread.

10. The system of claim 1, wherein the processing circuitry is configured to apply the dropout on the collection of input features received in the collective input layer, such that at least two different subsets each comprise a different number of features.

11. The system of claim 1 wherein the classification of the sample is a binary classification.

12. A computer implemented method of classification of tabular data using a deep learning ML model, the method comprising:

obtaining tabular data comprising one or more records, each record corresponding to a respective sample and comprising multiple features characterizing the sample;

utilizing a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;

wherein utilizing the ML model comprises:

providing to the ML model a collection of input features extracted from the tabular data;

for each NN thread:

applying a dropout operation on the collection of input features, to thereby obtain a respective subset of features selected from the collection of input features;

applying a neural network algorithm on the respective subset of features to thereby obtain respective NN thread output at a respective output layer; and providing the respective NN thread output to the collective integration layer; and calculating, at the collective integration layer, a collective output of the ML model based on the multiple NN outputs, the collective output being indicative of a classification of the sample to a class selected from at least two classes.

13. The method of claim 12, wherein the same neural network algorithm is applied in all NN threads.

14. The method of claim 12 further comprising:

generating the tabular data based on image data, where each record in the tabular data corresponds to a respective sample identified in an image, and the features in the record are features characterizing the sample.

15. The method of claim 12, wherein the sample is a defect in a semiconductor specimen, and the features are attributes characterizing the defect; and wherein the collective output is indicative of whether the sample is classified as a defect of interest (DOI) or not.

16. The method of claim 12 is implemented as part of an examination process dedicated for detecting defects of interest in runtime as part of a semiconductor manufacturing process.

17. The method of claim 12, wherein each NN thread is designed as an individual neural network (NN) comprising exactly two hidden layers.

18. A non-transitory computer readable medium comprising instructions that, when executed by a computer, cause the computer to perform a computerized method of classification of tabular data using a machine learning (ML) model, the method comprising:

obtaining tabular data comprising one or more records, each record corresponding to a respective sample and comprising multiple features characterizing the sample;

utilizing a machine learning (ML) model on the tabular data, wherein the ML model comprises a collective input layer, a collective integration layer, and multiple neural network (NN) threads, each NN thread connected between the collective input layer and the collective integration layer and being designed as an individual neural network (NN) comprising at least two hidden layers and an output layer;

wherein utilizing the ML model comprises:

providing to the ML model a collection of input features extracted from the tabular data;

for each NN thread:

applying a dropout operation on the collection of input features, to thereby obtain a respective subset of features selected from the collection of input features;

applying a neural network algorithm on the respective subset of features to thereby obtain respective NN thread output at a respective output layer; and providing the respective NN thread output to the collective integration layer; and calculating, at the collective integration layer, a collective output of the ML model based on the multiple NN outputs, the collective output being indicative of a classification of the sample to a class selected from at least two classes.

19. The non-transitory computer readable medium of claim 18, wherein the method comprises one or more of:

a) applying at least two different activation functions, such that at least two different NN threads each apply a different activation function;

b) applying the dropout on the collection of input features received in the collective input layer, such that at least two different subsets comprise a different number of features.

20. The non-transitory computer readable medium of claim 18, wherein the method comprising applying a unique activation function at each NN thread.

\* \* \* \* \*